US012752438B2

(12) United States Patent
Lim et al.

(10) Patent No.: US 12,752,438 B2
(45) Date of Patent: Oct. 6, 2026

(54) SUBSTRATE GRIPPER AND METHOD FOR MOVING A SUBSTRATE USING THE SAME

(71) Applicant: Absolics Inc., Covington, GA (US)

(72) Inventors: Chaemook Lim, Hwaseong-si (KR); Jae Won Lee, Hwaseong-si (KR)

(73) Assignee: Absolics Inc., Covington, GA (US)

( * ) Notice: Subject to any disclaimer, the term of this patent is extended or adjusted under 35 U.S.C. 154(b) by 262 days.

(21) Appl. No.: 18/399,622

(22) Filed: Dec. 28, 2023

(65) Prior Publication Data

US 2024/0399595 A1 Dec. 5, 2024

(30) Foreign Application Priority Data

Jun. 1, 2023 (KR) ........................ 10-2023-0071033

(51) Int. Cl.
*B25J 15/06* (2006.01)

(52) U.S. Cl.
CPC ................................. *B25J 15/0616* (2013.01)

(58) Field of Classification Search
CPC .............. B25J 15/0616; H01L 21/6838; H01L 21/68707; B65G 49/067
USPC .......................................................... 414/225
See application file for complete search history.

(56) References Cited

U.S. PATENT DOCUMENTS

2015/0314424 A1 11/2015 Kumakura et al.
2019/0308276 A1 10/2019 Suzuki et al.

FOREIGN PATENT DOCUMENTS

| | | | |
|---|---|---|---|
| CN | 216902876 | 7/2022 | |
| CN | 216902876 U * | 7/2022 | |
| JP | H05190414 | 7/1993 | |
| JP | 2004179399 | 6/2004 | |
| JP | 2006062801 | 3/2006 | |
| JP | 2010129653 | 6/2010 | |
| JP | 2012040668 | 3/2012 | |
| JP | 2013180891 | 9/2013 | |
| JP | 2015233065 | 12/2015 | |
| JP | 2015233065 A * | 12/2015 | ......... H01L 21/6838 |
| JP | 2016085439 | 5/2016 | |
| JP | 2020163436 | 10/2020 | |
| JP | 7103517 | 7/2022 | |
| KR | 20040060854 | 7/2004 | |
| KR | 1020080076895 | 8/2008 | |
| KR | 101019948 | 3/2011 | |
| KR | 20140078918 | 6/2014 | |
| KR | 20190037830 | 4/2019 | |

(Continued)

*Primary Examiner* — Michael McCullough
*Assistant Examiner* — Jessica L Burkman
(74) *Attorney, Agent, or Firm* — JCIP GLOBAL INC.

(57) ABSTRACT

A substrate gripper and a method of transferring a substrate using the same, includes a frame, a plurality of pad holes connected to the frame, and a plurality of suction pads disposed on the frame and connected to the pad holes, wherein the suction pad has a contact surface which comes into contact with one surface of a target substrate when the target substrate is mounted, the suction pad includes a first suction pad having a contact surface at a first height, without supporting the target substrate, and a second suction pad having a contact surface at a second height in a state of not supporting the target substrate, and the first height is greater than the second height based on the frame. In this way, the substrate gripper can stably suction and support the target substrate even when warpage occurs.

10 Claims, 10 Drawing Sheets

(56) References Cited

FOREIGN PATENT DOCUMENTS

| | | |
|---|---|---|
| KR | 102298088 | 9/2021 |
| TW | 201705339 | 2/2017 |
| TW | 201842550 | 12/2018 |
| WO | 2010041492 | 4/2010 |

* cited by examiner

SUBSTRATE GRIPPER AND METHOD FOR MOVING A SUBSTRATE USING THE SAME

CROSS-REFERENCE TO RELATED APPLICATION

This application claims priority to and the benefit of Korean Patent Application No. 10-2023-0071033, filed on Jun. 1, 2023, the disclosure of which is incorporated herein by reference in its entirety.

BACKGROUND

1. Field of the Invention

The present disclosure relates to a substrate gripper for transferring a warped substrate and a method of transferring a substrate using the same.

2. Discussion of Related Art

A substrate gripper is a component that is applied to a substrate transfer device and serves to fix a target substrate. In this case, the target substrate is often sensitive to a physical contact, such as a semiconductor wafer, a display panel, or the like.

There is an attempt for the substrate gripper to reduce a contact area with the target substrate. However, when the contact area of the substrate gripper with the target substrate is reduced, a gripping force can weaken and stability of a substrate transfer operation can decrease.

When the contact area between the substrate gripper and the target substrate is small, substrate warpage frequently occurs on a substrate surface not in contact with the substrate gripper in a large-area substrate such as a glass substrate. In this case, since a non-contact area with the target substrate is formed in a vacuum suction pad, there is a high possibility of the occurrence of vacuum leak.

The above-described background art is technical information that the inventors have possessed for derivation of the present invention or acquired during the derivation process, and thus the technical information cannot necessarily be referred to as the known art disclosed to the general public prior to filing the present invention.

SUMMARY OF THE INVENTION

The present disclosure is directed to providing a substrate gripper and a method of transferring a substrate, which is capable of stably transferring a substrate in which warpage occurs.

According to an aspect of the present disclosure, there is provided a substrate gripper including a frame, a plurality of pad holes connected to the frame, and a plurality of suction pads disposed on the frame and connected to the pad holes, wherein the suction pad has a contact surface which comes into contact with one surface of a target substrate when the target substrate is mounted, the suction pad includes a first suction pad having a first suction pad contact surface at a first height in a state of not supporting the target substrate; and a second suction pad having a second suction pad contact surface at a second height in a state of not supporting the target substrate, and the first height is greater than the second height based on the frame.

A horizontal gripping force of the second suction pad may be greater than a horizontal gripping force of the first suction pad.

A horizontal gripping force of the substrate gripper with respect to the target substrate relative to the sum of an area of the first suction pad contact surface and an area of the second suction pad contact surface may be 10 $mN/mm^2$ or more.

The horizontal gripping force with respect to the target substrate relative to the number of suction pads included in the substrate gripper may be 0.1 N/one suction pad or more.

The pad hole connected to the first suction pad may be connected to a first flow path, the pad hole connected to the second suction pad may be connected to a second flow path, and the first flow path and the second flow path may be controlled independently from each other.

A cross-sectional shape of the frame may be a polygonal shape, and the frame may be symmetric with respect to a center thereof based on the cross-sectional shape.

The second suction pad may include a flat-type vacuum pad.

The first suction pad may include a bellows-type vacuum pad.

The flat-type vacuum pad may include a circular-type pad or an oval-type pad.

According to another aspect of the present disclosure, there is provided a substrate gripper including a frame which includes a first coupling portion, and a protruding finger which is detachably coupled to the first coupling portion and protrudes outward of the frame based on a center of the frame, and the first suction pad may be disposed on the protruding finger.

According to still another aspect of the present disclosure, there is provided a substrate gripper including a frame which includes a second coupling portion, and a recessed finger which is detachably coupled to the second coupling portion and is recessed inward of the frame based on a center of the frame, and the second suction pad may be disposed on the recessed finger.

The protruding finger may have lower tensile strength than the frame.

The recessed finger may have lower tensile strength than the frame.

A difference between the first height and the second height may be 30 mm or less based on the frame.

According to still another aspect of the present disclosure, there is provided a method of transferring a substrate, which is a method of transferring a target substrate using the above-described substrate gripper, that includes a first operation in which the first suction pad and the target substrate come into contact with each other, and a second operation in which the second suction pad and the target substrate come into contact with each other.

The first operation may include making an inside of the first suction pad as a vacuum to suction the target substrate, and the second operation may include making an inside of the second suction pad as a vacuum to suction the target substrate.

DETAILED DESCRIPTION OF EXEMPLARY EMBODIMENTS

Figure 1:
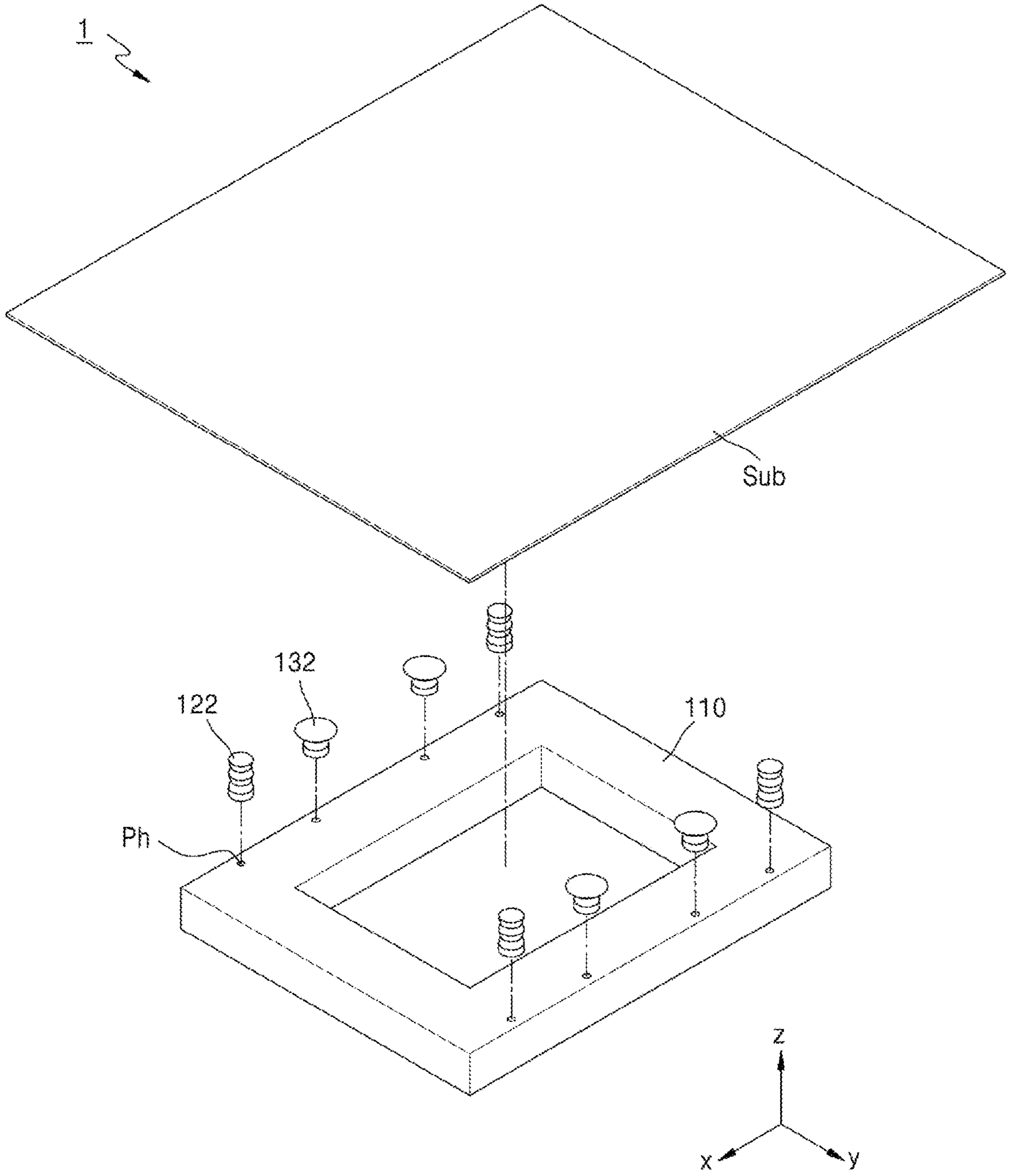
FIG. 1 is a conceptual diagram for describing a substrate gripper according to an embodiment.

Hereinafter, examples of embodiments will be described in detail with reference to the accompanying drawings so that those skilled in the art to which the present invention pertains can easily carry out the embodiments. However, the embodiments may be implemented in several different forms and are not limited to the embodiments described herein. Throughout the present specification, the same reference numerals are assigned to similar components.

Throughout the present specification, the term "a combination thereof" included in an expression of a Markush form means a mixture or combination of one or more selected from the group consisting of components described in the expression of the Markush form and means including one or more selected from the group consisting of the above components.

Throughout the present specification, the term "A and/or B" means "A, B, or A and B."

Throughout the present specification, terms such as "first" and "second" are used to distinguish the same terms from each other. In addition, the singular form includes the plural form unless the context clearly notes otherwise.

Throughout the present specification, when a part "includes" a certain component, it means that other components may be further included, rather than excluding other components, unless otherwise stated.

Throughout the present specification, the meaning that B is disposed on A means that B is positioned directly on A or B is positioned on A with another layer interposed therebetween, and it is not interpreted as being limited to when B is positioned in contact with a surface of A.

In the present specification, the drawings may be presented with exaggerated or omitted configurations for the purpose of description, and thus the scope of rights of the present invention is not interpreted as limited.

Figure 2:
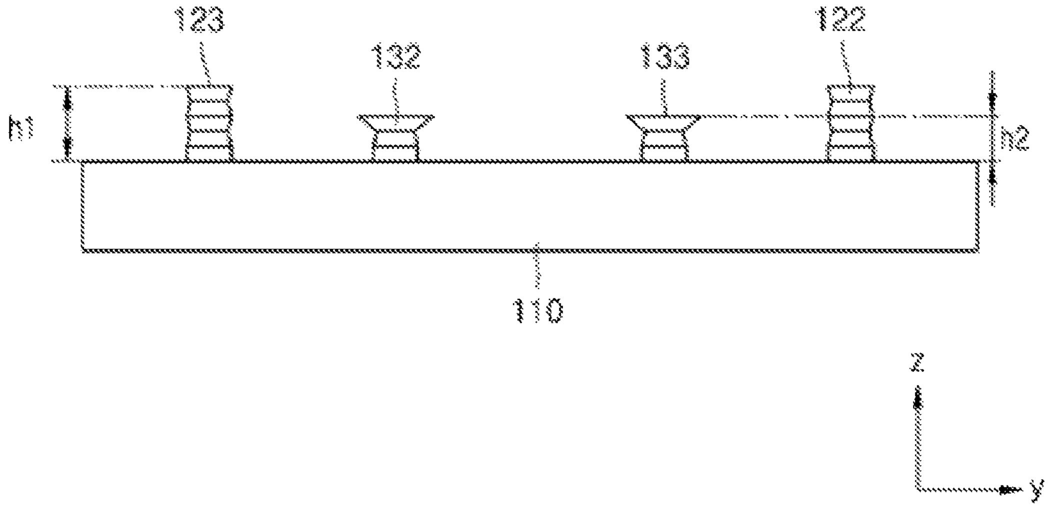
FIG. 2 is a plan view illustrating the substrate gripper according to the embodiment from an x-z plane of FIG. 1.
Figure 3:
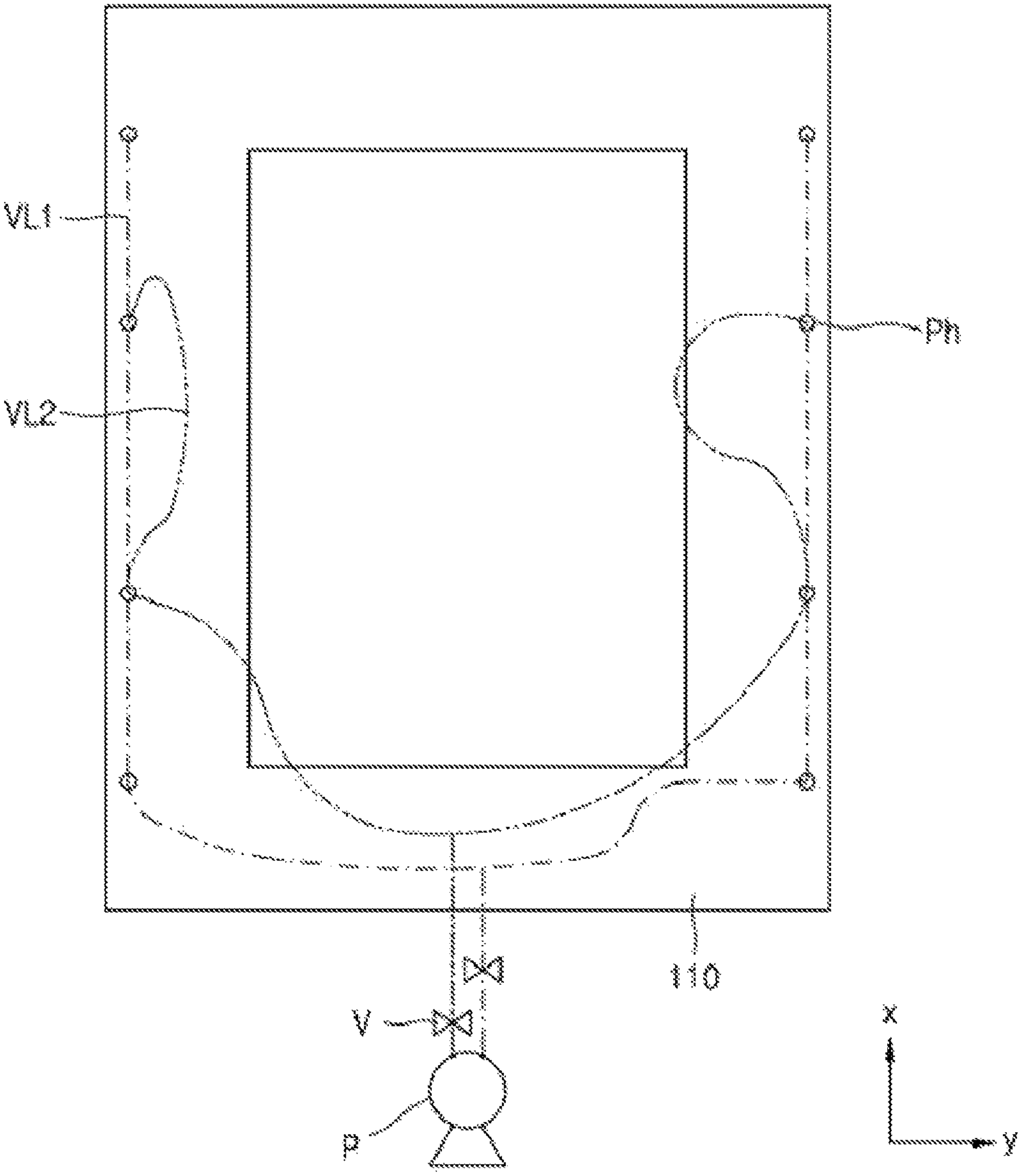
FIG. 3 is a plan view illustrating the substrate gripper according to the embodiment from an x-y plane of FIG. 1.
Figure 4:
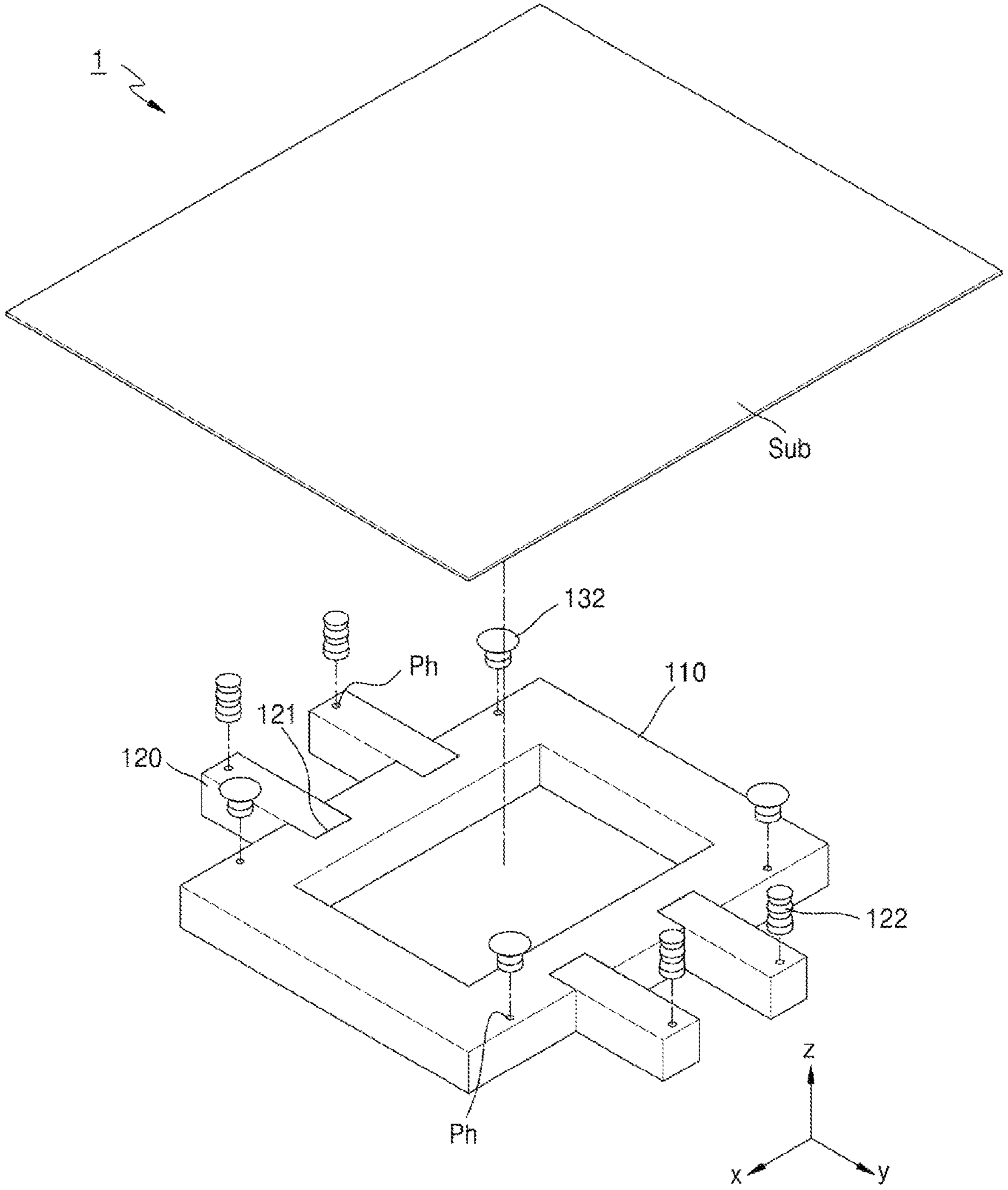
FIG. 4 is a conceptual diagram for describing a substrate gripper according to another embodiment.
Figure 5:
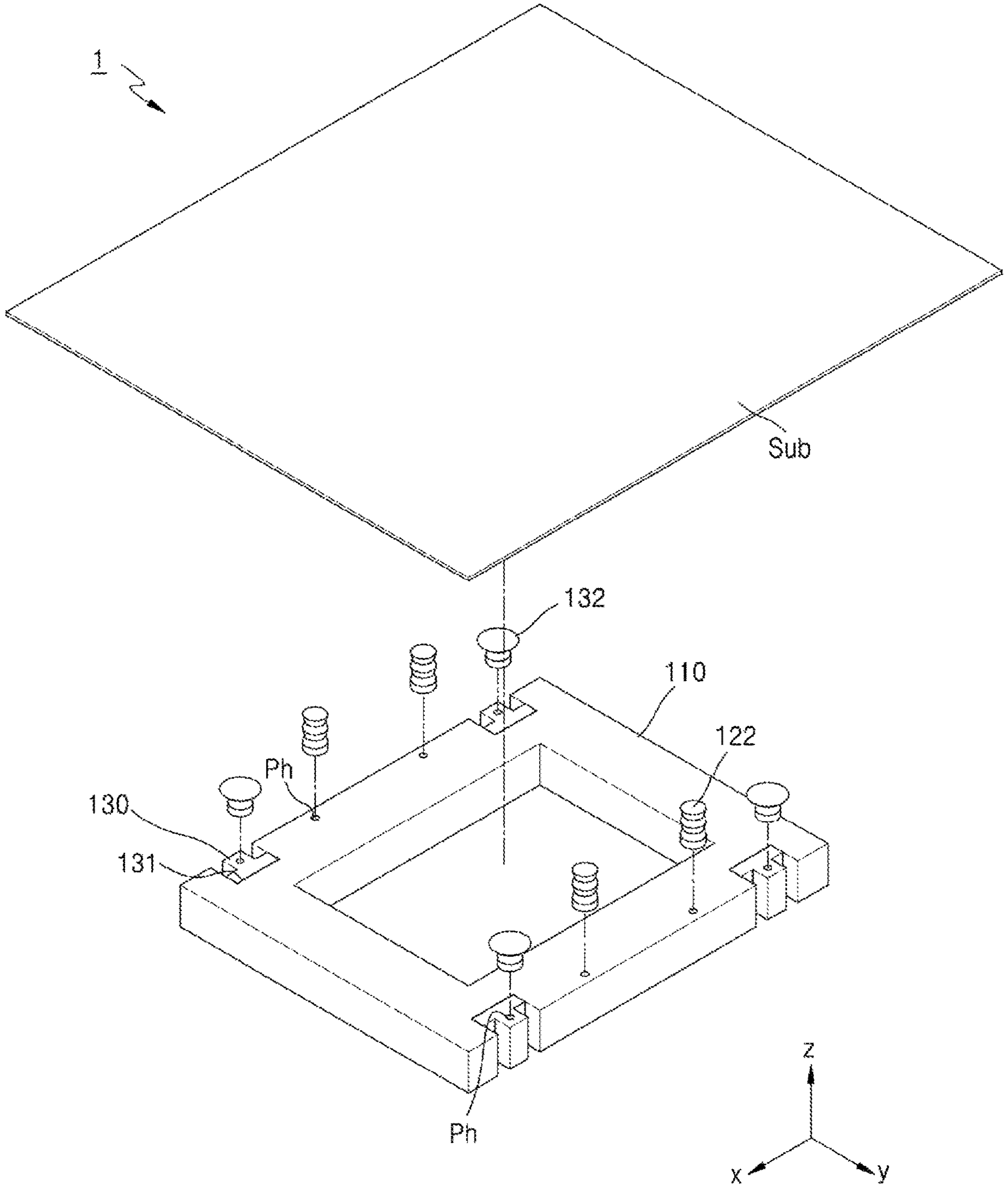
FIG. 5 is a conceptual diagram for describing a substrate gripper according to still another embodiment.
Figure 6:
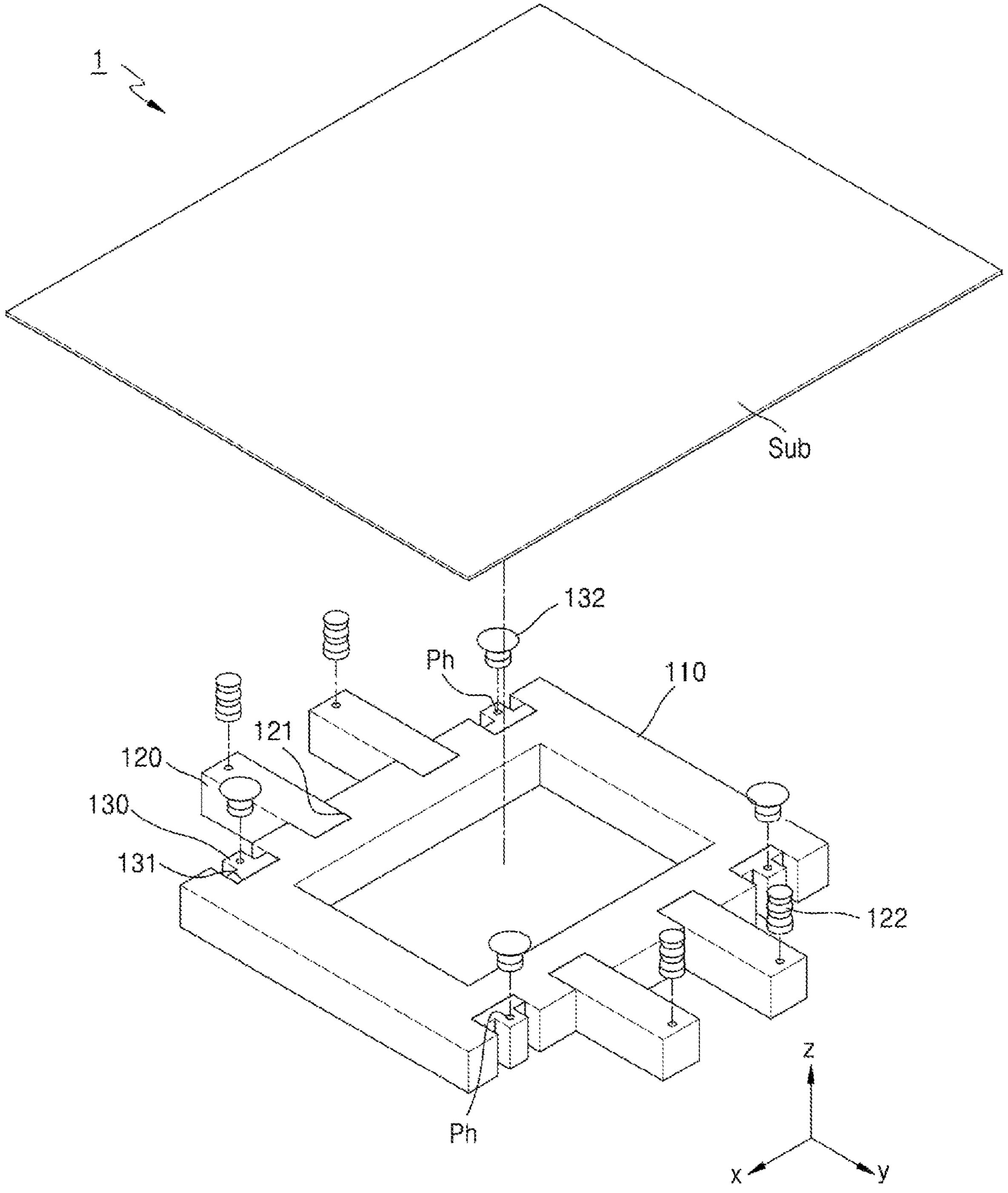
FIG. 6 is a conceptual diagram for describing a substrate gripper according to yet another embodiment.
Figure 7:
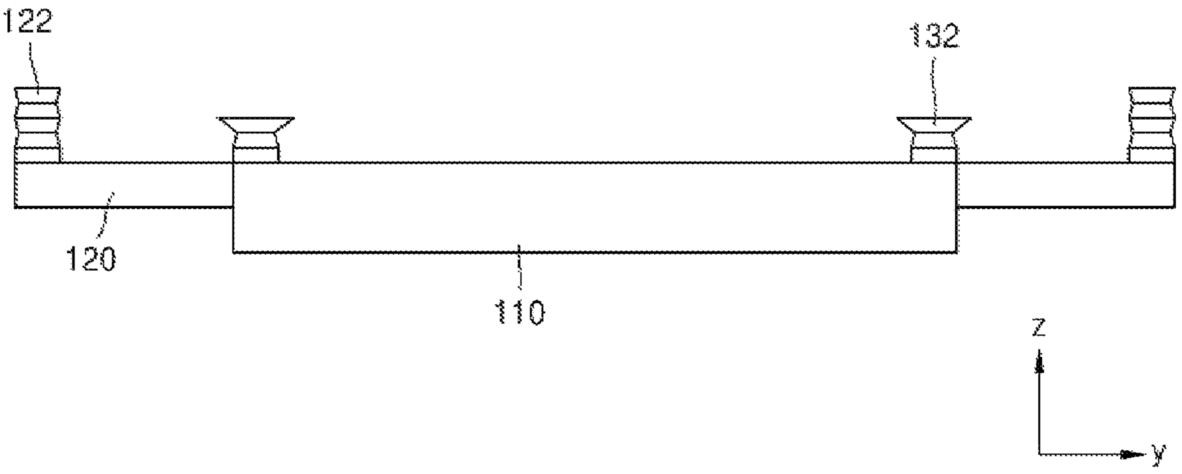
FIG. 7 is a plan view illustrating the substrate gripper according to the embodiment from a y-z plane of FIG. 6.
Figure 8:
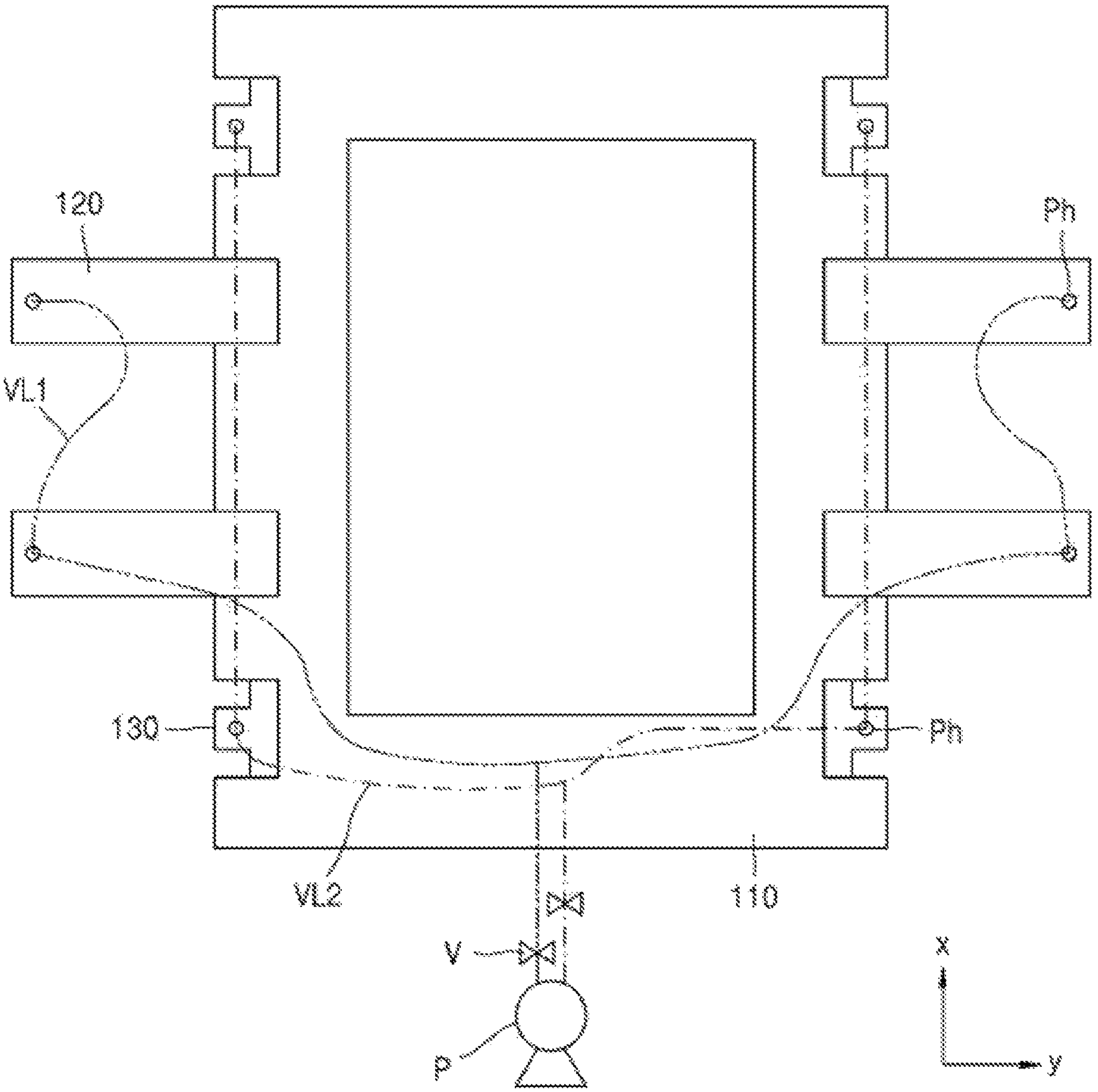
FIG. 8 is a plan view illustrating the substrate gripper according to the embodiment from an x-y plane of FIG. 6.
Figure 9:
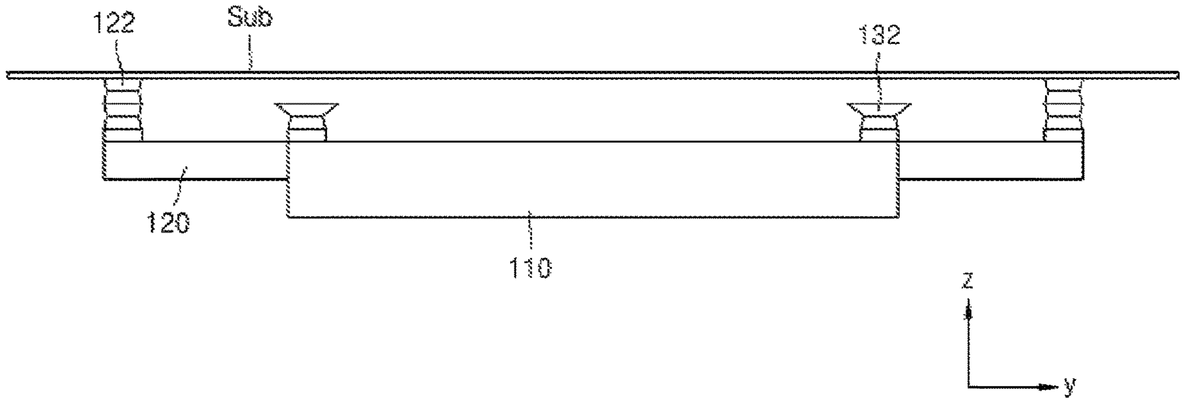
FIG. 9 is a conceptual diagram illustrating a first operation in which a target substrate is suctioned by the substrate gripper according to the embodiment.
Figure 10:
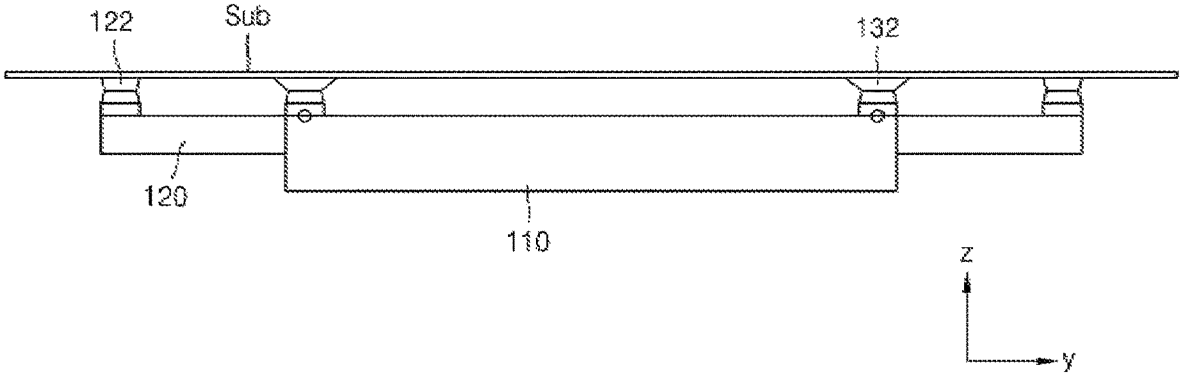
FIG. 10 is a conceptual diagram illustrating a second operation in which the target substrate is suctioned by the substrate gripper according to the embodiment.

FIG. 1 is a conceptual diagram for describing a substrate gripper according to an embodiment, FIG. 2 is a plan view illustrating the substrate gripper according to the embodiment from an x-z plane of FIG. 1, FIG. 3 is a plan view illustrating the substrate gripper according to the embodiment from an x-y plane of FIG. 1, FIG. 4 is a conceptual diagram for describing a substrate gripper according to another embodiment, FIG. 5 is a conceptual diagram for describing a substrate gripper according to still another embodiment, FIG. 6 is a conceptual diagram for describing a substrate gripper according to yet another embodiment, FIG. 7 is a plan view illustrating the substrate gripper according to the embodiment from a y-z plane of FIG. 6, FIG. 8 is a plan view illustrating the substrate gripper according to the embodiment from an x-y plane of FIG. 6, FIG. 9 is a conceptual diagram illustrating a first operation in which a target substrate is suctioned by the substrate gripper according to the embodiment, and FIG. 10 is a conceptual diagram illustrating a second operation in which the target substrate is suctioned by the substrate gripper according to the embodiment. Embodiments will be described in detail below with reference to the accompanying drawings.

Referring to FIG. 1, a substrate gripper 1 has a polygonal cross-sectional shape viewed from an x-y plane and includes a frame 110 with a symmetrical shape with respect to the center based on the cross-sectional shape and a plurality of suction pads. The frame 110 may include a plurality of pad holes Ph connected thereto. The plurality of suction pads may be disposed on the frame and connected to the plurality of pad holes. A target substrate Sub may be suctioned on the substrate gripper 1. In this way, the substrate gripper 1 may stably suction and support the target substrate Sub even when some warpage occurs. In addition, the substrate gripper 1 has not only a strong vertical gripping force but also a strong horizontal gripping force so that the substrate gripper 1 may stably suction and support the target substrate Sub.

Referring to FIG. 1, the frame 110 may include the plurality of pad holes Ph connected thereto.

A large-area substrate may be applied as the target substrate Sub. Specifically, an area of the target substrate may be 10,000 $mm^2$ or more, 30,000 $mm^2$ or more, 50,000 $mm^2$ or more, 70,000 $mm^2$ or more, 100,000 $mm^2$ or more, 200,000 $mm^2$ or more, or 250,000 $mm^2$ or more. The area of the target substrate may be 10,000,000 $mm^2$ or less, 5,000,000 $mm^2$ or less, 1,000,000 $mm^2$ or less, 750,000 $mm^2$ or less, 500,000 $mm^2$ or less, or 300,000 $mm^2$ or less.

The target substrate Sub may be, for example, a ceramic substrate or a glass substrate. For example, a silicon-based ceramic substrate or a glass-based ceramic substrate may be applied as the ceramic substrate. The silicon-based ceramic substrate may be a substrate which partially or entirely includes a silicon substrate, a silicon carbide substrate, etc. The glass-based ceramic substrate may be a substrate which partially or entirely includes a quartz substrate, a sapphire substrate, etc.

For example, an alkali borosilicate plate glass, an alkali-free alkaline earth borosilicate plate glass, or any plate glass as long as it can be used as a component of an electronic product may be applied as the glass substrate.

The suction pads may be disposed on the plurality of pad holes Ph. The suction pad includes a contact surface that comes into contact with one surface of the target substrate Sub when the target substrate Sub is mounted.

A friction coefficient between the suction pad and the target substrate Sub may be 0.1 or more. Specifically, the friction coefficient between the suction pad and the target substrate Sub may be 0.2 or more, 0.3 or more, or 0.4 or more. When the above range is satisfied, the horizontal gripping force of the suction pad is strong and is capable of stably supporting the target substrate Sub.

The friction coefficient between the suction pad and the target substrate Sub may be 0.9 or less. Specifically, the friction coefficient between the suction pad and the target substrate Sub may be 0.8 or less, 0.7 or more, or 0.6 or less. When the above range is satisfied, it can help maintain the horizontal gripping force between the suction pad and the target substrate and can help suppress damage during attachment and detachment of the target substrate Sub which is vulnerable to a physical impact.

Referring to FIG. 3, the substrate gripper 1 may further include a vacuum line, a vacuum valve, and a vacuum pump. The vacuum line may connect the vacuum pump to the plurality of pad holes. The vacuum pump may provide a vacuum pressure to each of the plurality of pad holes through the vacuum line. The vacuum pressure may be 10 kPa or more, 20 kPa or more, 30 kPa or more, 40 kPa or more, or 50 kPa or more. The vacuum pressure may be 101.325 kPa or less, 100 kPa or less, 90 kPa or less, 80 kPa or less, 70 kPa or less, or 60 kPa or less.

A cross-sectional area of the suction pad may be 5 $mm^2$ or more, 7 $mm^2$ or more, 10 $mm^2$ or more, 14.13 $mm^2$ or more, 20 $mm^2$ or more, 25.12 $mm^2$ or more, 28.26 $mm^2$ or more, or 30 $mm^2$ or more. The cross-sectional area of the suction pad may be 1,000 $mm^2$ or less, 500 $mm^2$ or less, 250 $mm^2$ or less, 150 $mm^2$ or less, 100 $mm^2$ or less, 50.24 $mm^2$ or less, 28.26 $mm^2$ or less, or 25.12 $mm^2$ or less. When the above range is satisfied, the vertical gripping force of the suction pad is sufficiently strong, the suction pad is capable of stably suctioning and supporting the target substrate Sub.

The vertical gripping force of the suction pad may be set by considering the cross-sectional area of the suction pad and a vacuum pressure. The vertical gripping force of the suction pad may be 0.1 N or more. Specifically, the vertical gripping force of the suction pad may be 0.2 N or more, 0.28 N or more, 0.5 N or more, 0.56 N or more, 1 N or more, 3 N or more, or 5 N or more. The vertical gripping force of the suction pad may be 20 N or less. Specifically, the vertical gripping force of the suction pad may be 15 N or less, 10 N or less, 5 N or less, 2.827 N or less, 1.005 N or less, 0.56 N or less, or 0.51 N or less.

The horizontal gripping force of the suction pad may be determined in proportion to the vertical gripping force and the friction coefficient. The horizontal gripping force of the suction pad may be 0.06 N or more. Specifically, the horizontal gripping force of the suction pad may be 0.084 N or more, 0.1 N or more, 0.22 N or more, 0.3 N or more, 0.401 N or more, 0.45 N or more, 0.9 N or more, or 1.5 N or more. The horizontal gripping force of the suction pad may be 18 N or less. Specifically, the horizontal gripping force of the suction pad may be 15 N or less, 13.5 N or less, 10 N or less, 5 N or less, 1.6962 N or less, 1 N or less, 0.81 N or less, 0.46 N or less, or 0.402 N or less. The number of suction pads included in the substrate gripper 1 is not limited to the number of the suction pads shown in the drawings. Specifically, the substrate gripper 1 may include two or more suction pads, four or more suction pads, or eight or more suction pads.

The number of suction pads included in the substrate gripper 1 may be determined according to the area of the target substrate Sub to be applied. Specifically, the substrate gripper 1 may include two or more suction pads per 250,000 $mm^2$ of the area of the target substrate Sub, four or more suction pads per 500,000 $mm^2$ of the area of the target substrate Sub, or eight or more suction pads per 1,000,000 $mm^2$ of the area of the target substrate Sub. When the above range is satisfied, the substrate gripper 1 may stably suction and support the target substrate Sub even when a large-area substrate is applied as the target substrate Sub.

The suction pad may include a first suction pad 122 and/or a second suction pad 132, which have different heights, in a state of not supporting the target substrate.

When the substrate gripper 1 receives a force in a horizontal direction during a process of transferring the target substrate Sub, a falling phenomenon of the target substrate Sub may occur. In particular, when acceleration upon the substrate gripper 1 starting or stopping transfer after adsorbing the target substrate Sub is large, a force applied in the horizontal direction increases so that a possibility of the falling phenomenon of the target substrate Sub increases.

Referring to FIG. 10, when the first suction pad 122 and the second suction pad 132 of the substrate gripper 1 come into contact with the target substrate Sub, a horizontal gripping force of the substrate gripper 1 with respect to the target substrate Sub may be 0.1 N or more. Specifically, the horizontal gripping force of the substrate gripper 1 with respect to the target substrate Sub may be 0.2 N or more, 0.3 N or more, 0.336 N or more, 1 N or more, 1.5 N or more, and 1.608 N or more, 1.81 N or more, 2 N or more, 2.129 N or more, 3 N or more, 3.22 N or more, or 3.62 N or more. When the first suction pad 122 and the second suction pad 132 of the substrate gripper 1 come into contact with the target substrate Sub, the horizontal gripping force of the substrate gripper 1 with respect to the target substrate Sub may be 54 N or less. Specifically, the horizontal gripping force of the substrate gripper 1 with respect to the target substrate Sub may be 25 N or less, 10 N or less, 7.5 N or less, 6.7848 N or less, 6.43 N or less, and 5 N or less, 3.62 N or less, 3.22 N or less, or 3 N or less. When the above range is satisfied, the falling phenomenon of the target substrate Sub may be minimized even when acceleration increases when the transfer is started or stopped after the target substrate Sub is suctioned.

The sum of an entire area of first suction pad contact surface 123 and an entire area of second suction pad contact surface 133, which are included in the substrate gripper 1, may be 20 $mm^2$ or more. Specifically, the sum of the entire area of first suction pad contact surface 123 and the entire area of second suction pad contact surface 133 may be 28 $mm^2$ or more, 50 $mm^2$ or more, 56.5 $mm^2$ or more, 100 $mm^2$ or more, 100.48 $mm^2$ or more, 113.04 $mm^2$ or more, or 150 $mm^2$ or more. The sum of an entire area of first suction pad contact surface 123 and an entire area of second suction pad contact surface 133, which are included in the substrate gripper 1, may be 1000 $mm^2$ or less. Specifically, the sum of the entire area of first suction pad contact surface 123 and the entire area of second suction pad contact surface 133 may be 600 $mm^2$ or less, 300 $mm^2$ or less, 201 $mm^2$ or less, 113.08 $mm^2$ or less, or 100.5 $mm^2$ or less. When the above range is satisfied, the contact area between the substrate gripper 1 and the target substrate Sub and the horizontal gripping force may be appropriately adjusted while minimizing contamination of the target substrate Sub.

Referring to FIG. 10, when the first suction pad 122 and the second suction pad 132 of the substrate gripper 1 come into contact with the target substrate Sub, the horizontal gripping force of the substrate gripper 1 with respect to the target substrate Sub relative to the sum of the area of the first suction pad contact surface 123 and the area of the second suction pad contact surface 133 may be 10 $mN/mm^2$ or more. Specifically, the horizontal gripping force of the substrate gripper 1 with respect to the target substrate Sub relative to the sum of the area of the first suction pad contact surface 123 and the area of the second suction pad contact surface 133 may be 14.22 $mN/mm^2$ or more, 15 $mN/mm^2$ or more, 18.83 $mN/mm^2$ or more, or 20 $mN/mm^2$ or more. When the first suction pad 122 and the second suction pad 132 of the substrate gripper 1 come into contact with the target substrate Sub, the horizontal gripping force of the substrate gripper 1 with respect to the target substrate Sub relative to the sum of the areas of the first suction pad contact surface 123 and the area of the second suction pad contact surface 133 may be 2000 $mN/mm^2$ or less. Specifically, the horizontal gripping force of the substrate gripper 1 with respect to the target substrate Sub relative to the sum of the area of the first suction pad contact surface 123 and the area of the second suction pad contact surface 133 may be 1928.57 $mN/mm^2$ or less, 1000 $mN/mm^2$ or less, 100 $mN/mm^2$ or less, 67.49 $mN/mm^2$ or less, 50 $mN/mm^2$ or less, 37.8 $mN/mm^2$ or less, 25 $mN/mm^2$ or less, 21.19 $mN/mm^2$ or less, or 20 $mN/mm^2$ or less. When the above range is satisfied, a possibility of the falling phenomenon of the target substrate Sub can be reduced when the substrate gripper 1 starts or stops the transfer after suctioning the target substrate Sub while minimizing the contact surface between the substrate gripper 1 and the target substrate Sub.

The horizontal gripping force with respect to the target substrate relative to the number of suction pads included in the substrate gripper may be 0.1 N/one suction pad or more. Specifically, the horizontal gripping force with respect to the target substrate relative to the number of suction pads included in the substrate gripper may be 0.22 N/one suction pad or more, 0.3 N/one suction pad or more, 0.401 N/one suction pad or more, 0.45 N/one suction pad or more, 0.9 N/one suction pad or more, or 1.5 N/one suction pad or more. The horizontal gripping force with respect to the target substrate relative to the number of suction pads included in the substrate gripper may be 18 N/one suction pad or less. Specifically, the horizontal gripping force with respect to the target substrate relative to the number of suction pads included in the substrate gripper may be 15 N/one suction pad or less, 13.5 N/one suction pad or less, 10 N/one suction pad or less, 5 N/one suction pad or less, 1.6962 N/one suction pad or less, 1 N/one suction pad or less, 0.81 N/one suction pad or less, 0.46 N/one suction pad or less, or 0.402 N/one suction pad or less.

The first suction pad 122 may have the first suction pad contact surface 123 at a first height h1 based on the frame 110. The second suction pad 132 may have the second suction pad contact surface 133 at a second height h2 based on the frame 110. The first height h1 may be greater than the second height h2. In this case, when the target substrate Sub is suctioned on the substrate gripper 1, the first suction pad 122 may come into contact with the target substrate Sub earlier than the second suction pad 132 so that more stable substrate mounting can be implemented.

The first suction pad 122 and the second suction pad 132 may have a height difference ranging from 0.5 mm to 30 mm. Specifically, the first suction pad 122 and the second suction pad 132 may have a height difference of 30 mm or less, a height difference ranging from 1 mm to 20 mm, or a height difference ranging from 5 mm to 15 mm. When the above range is satisfied, the first suction pad 122 may come into contact with the target substrate Sub earlier than the second suction pad 132 even when warpage occurs in the target substrate Sub.

The horizontal gripping force may be adjusted by controlling the area of the suction pad contact surface, a vacuum pressure, the friction coefficient between the suction pad and the target substrate, etc. Meanwhile, after the first suction pad fixes displacement of the target substrate in which warpage occurs, it is necessary to strengthen the horizontal gripping force for stable transfer of the target substrate. The horizontal gripping force of the second suction pad may be greater than the horizontal gripping force of the first suction pad. In this case, by strengthening the horizontal gripping force of the substrate gripper, the target substrate may be stably fixed even against an impact that may occur when the target substrate and the substrate gripper move together.

The pad hole connected to the first suction pad 122 may be connected to a first flow path VL1. The pad hole connected to the second suction pad 132 may be connected to a second flow path VL2.

The first flow path VL1 and the second flow path VL2 may be controlled independently from each other. In this case, it is advantageous to control a degree of suction force and a start and end time of suction according to the suction pad.

The first suction pad 122 may be a bellows-type vacuum pad, and the second suction pad 132 may be a flat-type vacuum pad.

The bellows-type vacuum pad 122 is suitable for a target substrate Sub which has a height difference and includes a curved surface. Specifically, in the bellows-type vacuum pad 122, an inclination of a surface on which the target substrate is mounted may be flexibly changed according to a shape of a rear surface of the target substrate. That is, the bellows-type vacuum pad 122 may be bent according to a warpage degree of the target substrate Sub on a surface on which the target substrate Sub is mounted. Therefore, the bellows-type vacuum pad 122 may offset displacement of the curved target substrate Sub using the vacuum pressure provided from the vacuum pump P. In this way, the substrate gripper 1 may stably suction and support the target substrate Sub even when warpage occurs.

The flat-type vacuum pad 132 is suitable for a target substrate Sub with a relatively less curved surface. Specifically, since a ratio of the area of the contact surface to the height of the flat-type vacuum pad 132 is greater than a ratio of the area of the contact surface to the height of the bellows-type vacuum pad 122, the target substrate Sub may be stably supported without deformation even under horizontal external force.

One cross-sectional area of the flat-type vacuum pad 132 may be larger than one cross-sectional area of the bellows-type vacuum pad 122. Specifically, the cross-sectional area of the flat-type vacuum pad 132 may be 1.1 times or more, 1.2 times or more, or preferably 1.25 times or more the cross-sectional area of the bellows-type vacuum pad 122. The cross-sectional area of the flat-type vacuum pad 132 may be 5 times or less, 3 times or less, or 2 times or less the cross-sectional area of the bellows-type vacuum pad 122. When the above range is satisfied, the vertical gripping force of the flat-type vacuum pad 132 is strong so that the target substrate Sub may be stably suctioned and supported.

The flat-type vacuum pad 132 has the horizontal gripping force that is greater than the horizontal gripping force of the bellows-type vacuum pad 122. Specifically, the horizontal gripping force of the flat-type vacuum pad 132 may be 1.1 times or more, 1.2 times or more, or preferably 1.25 times or more the horizontal gripping force of the bellows-type vacuum pad 122. The horizontal gripping force of the flat-type vacuum pad 132 may be 5 times or less, 3 times or less, or 2 times or less the horizontal gripping force of the bellows-type vacuum pad 122. When the above range is satisfied, the substrate gripper 1 has the strong vertical gripping force and the horizontal gripping force and is capable of stably suctioning and supporting the target substrate Sub.

The flat-type vacuum pad 132 may include a circular-type pad. A contact surface of the circular-type pad may have a substantially circular shape. In this case, it can be easy to maintain horizontal of the target substrate even with a small number of vacuum pads.

The flat-type vacuum pad 132 may include an oval-type pad. A contact surface of the oval-type pad may have a substantially elliptical shape. In this case, it may be easy to include many vacuum pads in a small area.

The number of the bellows-type vacuum pads 122 may be greater than the number of the flat-type vacuum pads 132. In this case, the substrate gripper 1 may stably suction and support the target substrate Sub even when warpage occurs. The number of the bellows-type vacuum pads 122 may be less than the number of the flat-type vacuum pads 132. In this case, the substrate gripper 1 has the strong vertical gripping force and the horizontal gripping force and is capable of stably suctioning and supporting the target substrate Sub.

The plurality of bellows-type vacuum pads 122 and the plurality of flat-type vacuum pads 132 may be disposed to be substantially symmetric to an axis passing through the center of the frame 110. In this case, the target substrate Sub may substantially remain horizontal during the substrate transfer process.

The first flow path VL1 may be connected to the pad hole Ph connected to the first suction pad 122. The second flow path VL2 may be connected to the pad hole Ph connected to the second suction pad 132.

One example according to the present disclosure may include a first vacuum pump (not shown) connected to the first flow path VL1 and a second vacuum pump (not shown) connected to the second flow path VL2. In this case, only the first vacuum pump may operate to provide a vacuum pressure only to the bellows-type vacuum pad 122. Alternatively, only the second vacuum pump may operate to provide a vacuum pressure only to the flat-type vacuum pad 132. In this case, vacuum leakage can be minimized by blocking the vacuum pressure provided to the pad hole Ph connected to the flat-type vacuum pad 132 before the flat-type vacuum pad 132 comes into contact with the target substrate Sub.

Referring to FIG. 3, one example according to the present disclosure may include the vacuum pump P connected to the first flow path VL1 and the second flow path VL2. In addition, the first flow path VL1 and/or the second flow path VL2 may include a vacuum valve V. In this case, vacuum leakage can be minimized by blocking the vacuum pressure provided to the pad hole Ph connected to the flat-type vacuum pad 132 using the vacuum valve V before the flat-type vacuum pad 132 comes into contact with the target substrate Sub.

Referring to FIG. 4, in a substrate gripper 1 according to another example of the present disclosure, a frame 110 includes a first coupling portion 121 and a protruding finger 120 which is detachable from the first coupling portion 121 and protrudes outward from the frame 110 based on the center of the frame 110. All or some of a plurality of pad holes Ph may be disposed in the protruding finger 120. Other components of the substrate gripper 1 are the same as those in the above-described substrate gripper 1, and thus a duplicate description will be omitted.

The protruding finger 120 may include a different material from the frame 110.

The protruding finger 120 may include a material with tensile strength of 500 N/mm$^2$ or less. Specifically, the protruding finger 120 may include a material with tensile strength of 400 N/mm$^2$ or less, 300 N/mm$^2$ or less, 200 N/mm$^2$ or less, or 100 N/mm$^2$ or less. The protruding finger 120 may include a material with tensile strength of 10 N/mm$^2$ or more. When the above range is satisfied, formability of the protruding finger 120 can be improved. In this case, since it is easier to form the pad hole Ph in the protruding finger 120, which has better formability, than to form the pad hole Ph directly in the frame 110 so that processability can be improved.

The protruding finger 120 may include an Al alloy material containing at least one selected from the group consisting of Al, Si, Fe, Cu, Mn, Mg, Cr, Zn, Ti, and a combination thereof, but the present invention is not limited thereto. The Al alloy material may include, for example, an A6061 aluminum alloy.

The protruding finger 120 may have a structure capable of being detachably attached to the frame 110. As an example, the protruding finger 120 may be attached to a first coupling portion 121, and the first coupling portion 121 may fix the protruding finger 120 and the frame 110 by bolting.

Since the target substrate Sub is often sensitive to contact, using only a minimum number of suction pads relative to the area of the target substrate Sub is a way to prevent contamination of the target substrate and improve quality. In the present disclosure, the protruding finger 120 and the frame 110 are easily attachable and detachable so that the number of suction pads disposed on the frame may be easily adjusted according to the area of the target substrate Sub.

The frame 110 may include a material with tensile strength of 100 N/mm$^2$ or more. Specifically, the frame 110 may include a material with tensile strength of 200 N/mm$^2$ or more, 300 N/mm$^2$ or more, 400 N/mm$^2$ or more, 500 N/mm$^2$ or more, or 600 N/mm$^2$ or more.

The frame 110 may include a material with hardness of 100 HBW or more. Specifically, the frame 110 may include a material with hardness of 150 HBW or more, 200 HBW or more, 250 HBW or more, or 300 HBW or more. When the above range is satisfied, since the frame 110 holds the overall shape of the substrate gripper 10, the overall durability of the substrate gripper 10 can be increased.

The frame 110 may include carbon steel containing at least one selected from the group consisting of C, Si, Mn, P, S, Cu, Ni, Cr, and a combination thereof, but the present invention is not limited thereto. The carbon steel may include, for example, SM45C steel.

Referring to FIG. 5, in a substrate gripper 1 according to still another example of the present disclosure, a frame 110 includes a second coupling portion 131 and a recessed finger 130 which is attachable/detachable from the second coupling portion 131 and is recessed inward from the frame 110 based on the center of the frame 110. All or some of the plurality of pad holes Ph may be disposed in the recessed finger 130. Other components of the substrate gripper 1 are the same as those in the above-described substrate gripper 1, and thus a duplicate description will be omitted.

The recessed finger 130 may include a different material from the frame 110.

The recessed finger 130 may include a material with tensile strength of 500 N/mm$^2$ or less. Specifically, the recessed finger 130 may include a material with tensile strength of 400 N/mm$^2$ or less, 300 N/mm$^2$ or less, 200 N/mm$^2$ or less, or 100 N/mm$^2$ or less. The recessed finger 130 may include a material with tensile strength of 10 N/mm$^2$ or more. When the above range is satisfied, formability of the recessed finger 130 can be improved. In this case, since it is easier to form the pad hole Ph in the recessed finger 130, which has better formability, than to form the pad hole Ph directly in the frame 110 so that processability can be improved.

The recessed finger 130 may include an Al alloy material containing at least one selected from the group consisting of Al, Si, Fe, Cu, Mn, Mg, Cr, Zn, Ti, and a combination thereof, but the present invention is not limited thereto. The Al alloy material may include, for example, an A6061 aluminum alloy.

The recessed finger 130 may have a structure capable of being detachably attached to the frame 110. As an example, the recessed finger 130 may be attached to the second coupling portion 131, and the second coupling portion 131 may fix the recessed finger 130 and the frame 110 by bolting.

Since the target substrate Sub is often sensitive to contact, using only a minimum number of suction pads relative to the area of the target substrate Sub is a way to prevent contamination of the target substrate and improve quality. In the present disclosure, the recessed finger 130 and the frame 110 are easily attachable and detachable so that the number of suction pads disposed on the frame may be easily adjusted according to the area of the target substrate.

Referring to FIG. 6, in a substrate gripper 1 according to yet another example of the present disclosure, a frame 110 includes a first coupling portion 121 and a protruding finger 120 which is detachable from the first coupling portion 121 and protrudes outward from the frame 110 based on the center of the frame 110. In the substrate gripper 1, the frame 110 includes a second coupling portion 131 and a recessed finger 130 which is detachable from the second coupling portion 131 and is recessed inward from the frame 110 based on the center of the frame 110. All or some of a plurality of pad holes Ph may be disposed in the protruding finger 120 and the recessed finger 130. Other components of the substrate gripper 1 are the same as those in the above-described substrate gripper 1, and thus a duplicate description will be omitted.

A bellows-type vacuum pad 122 may be disposed on the protruding finger 120. The bellows-type vacuum pad 122 may be connected to the pad hole Ph. The flat-type vacuum pad 132 may be disposed on the recessed finger 130. The flat-type vacuum pad 132 may be connected to the pad hole Ph. The bellows-type vacuum pad 122 may be further away from the center of the frame 110 than the flat-type vacuum pad 132. In this case, since the bellows-type vacuum pad 122, which comes into first contact with the target substrate Sub, offsets displacement of the target substrate Sub and stably suctions and supports the target substrate Sub even when warpage occurs, thereby substantially maintaining the target substrate Sub horizontally.

Referring to FIG. 8, a vacuum line may include a first flow path VL1 and a second flow path VL2. The first flow path VL1 and the second flow path VL2 may be controlled independently from each other. The first flow path VL1 may be connected to the pad hole Ph disposed in the protruding finger 120. The second flow path VL2 may be connected to the pad hole Ph disposed in the recessed finger 130. A method of minimizing vacuum leakage by separately controlling the first flow path VL1 and the second flow path VL2 is the same as the method described with reference to the substrate gripper 1, and thus a duplicate description will be omitted.

Hereinafter, a method of transferring a substrate using the substrate gripper 1 according to an example of the present disclosure will be described. A configuration of the substrate gripper 1 is the same as the above-described substrate gripper 1, and thus a duplicate description will be omitted.

Referring to FIGS. 9 and 10, the method of transferring a substrate using the substrate gripper 1 according to an example of the present disclosure includes a first operation in which the substrate target is mounted on the first suction pad, and a second operation in which the first suction pad contracts and thus the target substrate is mounted on the second suction pad.

The first operation may include making a vacuum inside of the first suction pad to suction the target substrate. A description of the second suction pad is the same as the above description, and thus a duplicate description will be omitted. The making of the vacuum inside the suction pad using the vacuum pump is the same as the above description, and thus a duplicate description will be omitted. In the first operation according to an example of the present disclosure, the bellows-type vacuum pad comes into first contact with the target substrate to offset displacement of the target substrate in which warpage occurs, thereby stably suctioning and transferring the bent substrate.

In the first operation, a vacuum pressure may be provided inside the bellows-type vacuum pad to make a vacuum state, but the vacuum pressure may not be provided inside the flat-type vacuum pad. In this way, by preventing the vacuum state from being made before the flat-type vacuum pad comes into contact with the target substrate, a vacuum leakage phenomenon is prevented from occurring.

The second operation may include making a vacuum inside the flat-type vacuum pad to suction the target substrate. A description of the flat-type vacuum pad is the same as the above description, and thus a duplicate description will be omitted.

In the second operation according to an example of the present disclosure, the curved substrate according to the first operation is stably suctioned and the flat-type vacuum pad, which has a horizontal gripping force that is relatively stronger than that of the bellows-type vacuum pad, suctions the target substrate so that a gripping force between the gripper and the target substrate can be further strengthened.

A substrate gripper according to embodiments can increase a contact force with a target substrate in which warpage occurs and can help to stably transfer the target substrate.

In addition, a method of transferring a substrate according to embodiments can stably transfer a target substrate in which warpage occurs.

Although exemplary embodiments of the present invention have been described in detail, the scope of the prevent invention is not limited to these embodiments, and various modifications and improvements devised by those skilled in the art using the fundamental concept of the exemplary embodiments of the present invention, which is defined by the appended claims, further fall within the scope of the present invention.

What is claimed is:

1. A substrate gripper for moving a glass or ceramic substrate, the substrate gripper comprising:

a frame;

a plurality of pad holes connected to the frame; and a plurality of suction pads disposed on the frame and connected to the pad holes, wherein the suction pad has a contact surface which comes into contact with one surface of a target substrate when the target substrate is mounted, the suction pad comprises:

a first suction pad having a first suction pad contact surface at a first height in a state of not supporting the target substrate; and a second suction pad having a second suction pad contact surface at a second height in a state of not supporting the target substrate, the first height is greater than the second height based on the frame, a horizontal gripping force of the second suction pad is greater than a horizontal gripping force of the first suction pad, the second suction pad comprises a flat-type vacuum pad, the first suction pad comprises a bellows-type vacuum pad, a horizontal gripping force of the substrate gripper with respect to the target substrate relative to the number of suction pads comprised in the substrate gripper is 0.1 N/one suction pad or more, the frame comprises a first coupling portion, and a protruding finger which is detachably coupled to the first coupling portion and protrudes outward of the frame based on a center of the frame, the frame comprises a second coupling portion, and a recessed finger which is detachably coupled to the second coupling portion and is recessed inward of the frame based on the center of the frame, the first suction pad is disposed on the protruding finger, the second suction pad is disposed on the recessed finger, and the first suction pad comprising the bellows-type vacuum pad is disposed further away from the center of the frame than the second suction pad comprising the flat-type vacuum pad.

2. The substrate gripper of claim 1, wherein the horizontal gripping force of the substrate gripper with respect to the target substrate relative to a sum of an area of the first suction pad contact surface and an area of the second suction pad contact surface is 10 $mN/mm^2$ or more.

3. The substrate gripper of claim 1, wherein:

the pad hole connected to the first suction pad is connected to a first flow path;

the pad hole connected to the second suction pad is connected to a second flow path; and the first flow path and the second flow path are controlled independently from each other.

4. The substrate gripper of claim 1, wherein a cross-sectional shape of the frame is a polygonal shape, and the frame is symmetric with respect to the center thereof based on the cross-sectional shape.

5. The substrate gripper of claim 1, wherein the flat-type vacuum pad comprises a circular-type pad or an oval-type pad.

6. The substrate gripper of claim 1, wherein the protruding finger has lower tensile strength than the frame.

7. The substrate gripper of claim 1, wherein the recessed finger has lower tensile strength than the frame.

8. The substrate gripper of claim 1, wherein a difference between the first height and the second height is 30 mm or less based on the frame.

9. A method of transferring a substrate, which is a method of transferring a target substrate using the substrate gripper according to claim 1, the method comprising:

a first operation in which the first suction pad and the target substrate come into contact with each other; and a second operation in which the second suction pad and the target substrate come into contact with each other.

10. The method of claim 9, wherein:

the first operation comprises making an inside of the first suction pad as a vacuum to suction the target substrate; and the second operation comprises making an inside of the second suction pad as a vacuum to suction the target substrate.

* * * * *